Patented Apr. 28, 1931

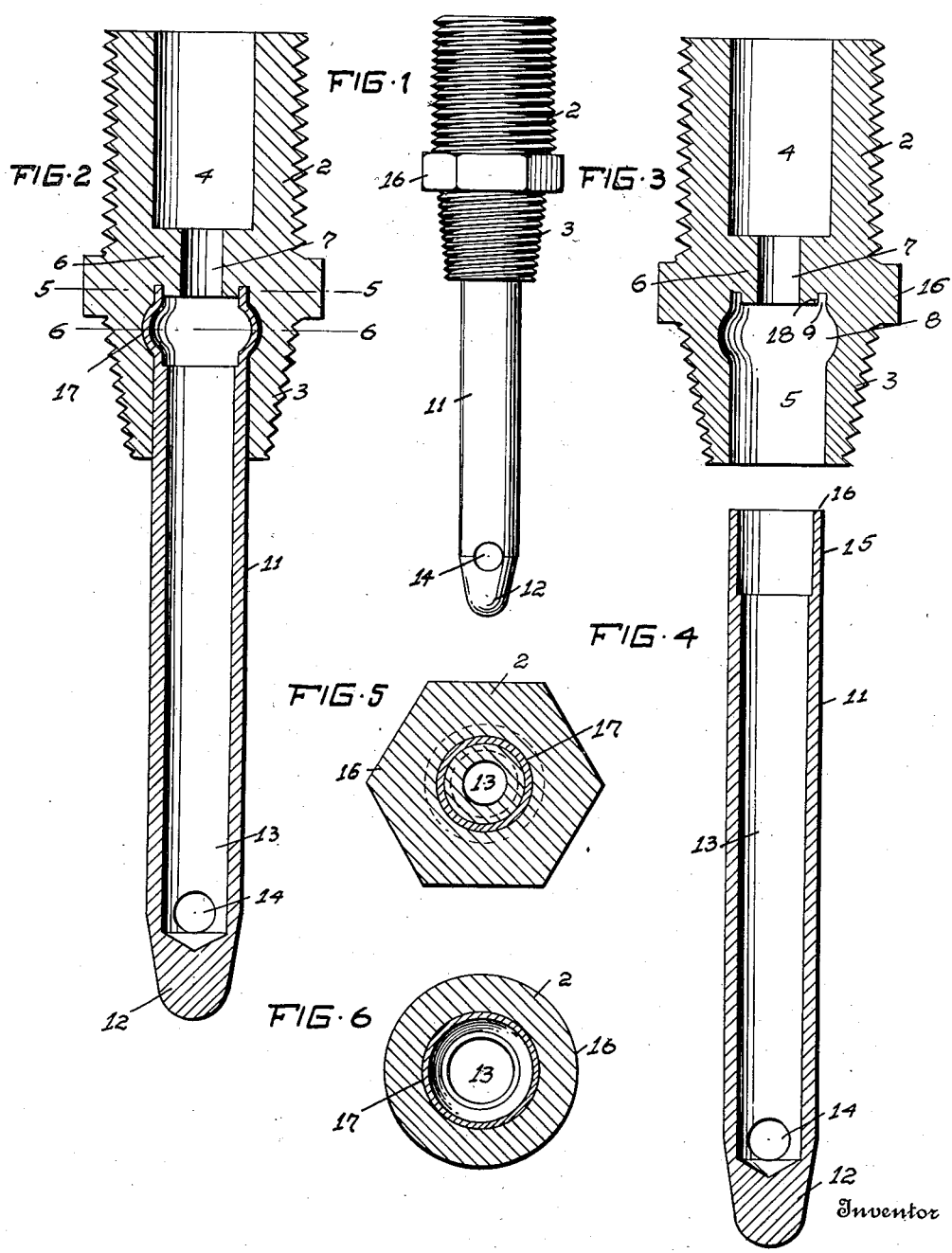

1,802,538

UNITED STATES PATENT OFFICE

LADDIE RYCH, OF CLEVELAND, OHIO, ASSIGNOR TO ALBERT J. WEATHERHEAD, JR., OF CLEVELAND, OHIO

TUBULAR CONNECTION

Application filed August 11, 1927. Serial No. 212,267.

My invention relates to an improvement in tubular connections and in a mode or method of producing the same in a simple and efficient way all substantially as herein shown and described and more concisely set forth in the claims. The tubular connection itself is of especial value and utility in and for a certain type of valve assembly or coupling device which is commonly used with gasoline feed appliances in internal combustion engines. This coupling device comprises a tubular member forming a part of and serving as an extension for a valve body or plug member. The connection between the tube and body requires that it be permanently sealed and air or vacuum tight, and competitive business demands that the structure be inexpensive to produce. The tube is closed at its outer end or so formed that tools cannot be readily inserted into the tube to secure the two parts together in perfect sealing relation, and the construction of the body member is also such that the use of tools therein is made difficult or impracticable in connecting the parts together. Considering the foregoing, the present invention has been devised to permit such devices to be produced simply, quickly and cheaply, and with an exceptionally tight sealing fit and permanent connection between the tube and body, the parts being formed in a particular way to facilitate uniting the tube and body together by a simple telescopic operation and the use of pressure applied longitudinally to the tube itself.

In the accompanying drawings, Fig. 1 is a side elevation of a two piece assembly embodying the invention, and Fig. 2 is a sectional view of the same pieces but on a larger scale. Fig. 3 is a sectional view of the screw plug or body member, and Fig. 4 is a sectional view of the tubular member as it appears before it is connected with said body member. Figs. 5 and 6 are transverse sections of the device on lines 5—5 and 6—6, respectively, of Fig. 2.

The tubular connection or coupling device shown in the drawing, comprises a screw-threaded body 2 having a tapered screw-threaded extension 3 which is adapted to be screwed into a screw-threaded opening in some fixed or attached part of an integral combustion engine where vacuum or compression takes place. The body and its extension contain two round bores or passages 4 and 5, respectively, connected by a smaller bore or opening 7 in a division wall or diaphragm 6. The passages and connecting opening are made by drilling or boring operations. Upper bore 4 may contain valve parts (not shown) or it may be used without such parts in some installations. Lower bore 5 extends into the tapered screw-threaded extension 3 on straight lines for a substantial distance and then is enlarged or swells in diameter on curved lines to form a rounded annular channel or groove 8 at the inner end of the bore but which inner end is extended a short distance on straight lines into the shouldered part of the body or diaphragm 6, thereby forming a second annular groove 9 concentric with the opening 7 in said wall or diaphragm, see Fig. 3. Body 2 is also provided with a hexagonal enlargement 10 in the region of or surrounding groove 9, and the drilling, grooving and channeling operations may all be performed in and by automatic screw machines.

Having a body 2 constructed and formed as described a tubular member 11 of predetermined length is inserted into bore 5 thereof. One end of this tube is closed, that is, it has a solid head 12 which closes one end of the passage or hollow interior 13, although one or more lateral openings 14 are formed in the side wall of the tube near head 12. The opposite or upper end of tube 11 is counterbored on straight lines to provide an extension 15 having a wall of less thickness than the body wall of the tube. The thinner extension wall is of substantially the same thickness as the width of groove 9 in diaphragm 6 so that when tube 11 is inserted the full depth of bore 5 in body 2 the end edge 16 of extension 15 will fit snugly within groove 9 and engage tightly against the diaphragm or wall 6. Pressure is then applied longitudinally of tube 11 and a driving fit effected with a resultant outward bulging of the wall of extension 15 opposite the swelling channel 8 in body 2. This operation produces a round annular bead 17 in the thinner part or end 15 of tube 11, which bead has the corresponding shape of the channel and fits so tightly therein that a permanent connection and fluid-tight seal is established, and which seal is further supplemented by the spreading of the thin stock in the end edge 16 against the side and base walls of groove 9 in diaphragm 6. In telescoping the two parts together under sufficient pressure to effect a fluid-tight seal and union as described, the main wall of the tube (which is thicker or heavier than the wall of extension 15) is backed and held by the relatively thicker wall of the screw-threaded extension 3 of body 2. The operation of uniting the two parts is thus seen to be very simple, as it consists merely in telescoping the two parts under sufficient pressure longitudinally to bulge the tube at its inner and thinner end. In so doing the end edge of the tube is also locked by being upset within groove 9, and upsetting of the end edge inwardly toward the axis is prevented by the inner annular wall 18 of the groove, see Fig. 5.

What I claim, is:

1. A tubular connection, comprising a body part having passages of different diameters and a grooved shoulder portion together with a rounded annular channel adjacent the grooved portion, and a tubular part having one end thereof wedged within the grooved shoulder portion and also expanded in part to a larger diameter within said channel.

2. A tubular connection, comprising a body part having co-axially-extending communicating passages of different diameters and a shoulder portion having an annular groove concentric with said passages, the side wall of the larger passage having a rounded channel adjacent said groove, and a tubular part having one end reduced in thickness and wedged in said groove and expanded outwardly to a larger diameter into said channel.

In testimony whereof I affix my signature.

LADDIE RYCH.